United States Patent
Loison et al.

(10) Patent No.: US 11,498,877 B2
(45) Date of Patent: Nov. 15, 2022

(54) METHOD FOR TREATING SILICON CARBIDE FIBRES

(71) Applicants: SAFRAN CERAMICS, Le Haillan (FR); CENTRE NATIONAL DE LA RECHERCHE SCIENTIFIQUE, Paris (FR)

(72) Inventors: Sylvie Loison, Moissy-Cramayel (FR); Lucile Henry, Talence (FR); Cyril Aymonier, Begles (FR); Chrystel Huguet, Moissy-Cramayel (FR)

(73) Assignees: SAFRAN CERAMICS, Le Haillan (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 253 days.

(21) Appl. No.: 16/767,833

(22) PCT Filed: Nov. 16, 2018

(86) PCT No.: PCT/FR2018/052889
§ 371 (c)(1),
(2) Date: May 28, 2020

(87) PCT Pub. No.: WO2019/106257
PCT Pub. Date: Jun. 6, 2019

(65) Prior Publication Data
US 2020/0377416 A1    Dec. 3, 2020

(30) Foreign Application Priority Data
Nov. 29, 2017 (FR) ........................ 1761352

(51) Int. Cl.
*C04B 35/628* (2006.01)
*C04B 35/626* (2006.01)
(Continued)

(52) U.S. Cl.
CPC ........ *C04B 35/62849* (2013.01); *C04B 35/52* (2013.01); *C04B 35/521* (2013.01);
(Continued)

(58) Field of Classification Search
CPC ............ C04B 35/565; C04B 35/62549; C04B 35/6265; C04B 35/62675
See application file for complete search history.

(56) References Cited

U.S. PATENT DOCUMENTS

| | | | |
|---|---|---|---|
| 6,291,058 B1 * | 9/2001 | Goujard | ............... C04B 35/80 428/294.1 |
| 9,574,299 B2 * | 2/2017 | Loison | ................. D06M 11/74 |
| 2018/0301237 A1 | 10/2018 | Yamagami et al. | |

FOREIGN PATENT DOCUMENTS

| | | |
|---|---|---|
| CN | 102220621 A | 10/2011 |
| CN | 105175013 A | 12/2015 |

(Continued)

OTHER PUBLICATIONS

Yao et al., "Oxidation behavior of Hi-Nicalon SiC monofilament fibres in air and O2—H2O—Ar atmospheres", 2012, Corrosion Sciences 57, pp. 182-191. (Year: 2012).*

(Continued)

*Primary Examiner* — Robert A Vetere
(74) *Attorney, Agent, or Firm* — Pillsbury Winthrop Shaw Pittman LLP

(57) ABSTRACT

A method of treating at least one silicon carbide fibre, the method including a) formation of a silica layer at the surface of a silicon carbide fibre having an oxygen content less than or equal to 1% in atomic percentage, the silica layer being formed by contacting this fibre with an oxidizing medium having a temperature greater than or equal to 50° C. and pressure greater than or equal to 1 MPa, and b) removal of the silica layer formed by hydrothermal treatment of the fibre obtained after implementation of step a) in which the (Continued)

fibre is treated with water at a pressure between saturating vapour pressure and 30 MPa and at a temperature less than or equal to 400° C.

11 Claims, 3 Drawing Sheets

(51) Int. Cl.
    *C04B 35/78*     (2006.01)
    *C04B 41/45*     (2006.01)
    *C04B 35/52*     (2006.01)
    *C04B 35/565*     (2006.01)
    *C04B 35/571*     (2006.01)
    *C04B 35/573*     (2006.01)
    *C04B 35/80*     (2006.01)
(52) U.S. Cl.
    CPC .......... *C04B 35/565* (2013.01); *C04B 35/571* (2013.01); *C04B 35/573* (2013.01); *C04B 35/6265* (2013.01); *C04B 35/62675* (2013.01); *C04B 35/62868* (2013.01); *C04B 35/62894* (2013.01); *C04B 35/78* (2013.01); *C04B 35/80* (2013.01); *C04B 41/4558* (2013.01); *C04B 2235/5244* (2013.01); *C04B 2235/614* (2013.01); *C04B 2235/616* (2013.01)

(56) References Cited

FOREIGN PATENT DOCUMENTS

| FR | 2 640 258 A1 | 6/1990 |
|---|---|---|
| WO | WO 2006/136755 A2 | 12/2006 |
| WO | WO 2014/114874 A | 7/2014 |
| WO | WO 2016/207534 A1 | 12/2016 |
| WO | WO 2017/086452 A1 | 5/2017 |

OTHER PUBLICATIONS

International Search Report as issued in international Patent Application No. PCT/FR2018/052889, dated Feb. 20, 2019.
Gomi, et al., "Strength Degradation of SiC Fiber by Hydro-Thermal Treatment and its Application to the Surface Modifications of SiC Fiber," EFC 13: Proceedings of the 13$^{th}$ European Conference on Fracture (CD-ROM), Oct. 2000, XP002712908, 8 pages, Retrieved from the Internet: URL:http://www.gruppofrattura.it/ocs/index.php/esis/ECF13/paper/viewFile/8608/5504, [retrieved on Sep. 13, 2013].

\* cited by examiner

METHOD FOR TREATING SILICON CARBIDE FIBRES

CROSS-REFERENCE TO RELATED APPLICATIONS

This application is the U.S. National Stage of PCT/FR2018/052889, filed Nov. 16, 2018, which in turn claims priority to French patent application number 1761352 filed Nov. 29, 2017. The content of these applications are incorporated herein by reference in their entireties.

The present invention relates to a method of treating at least one silicon carbide fibre (SiC) making it possible to improve the quality of the bonding of this fibre to a coating that covers it.

BACKGROUND OF THE INVENTION

The manufacture of parts made of composite material reinforced with silicon carbide fibres is well known. It comprises the production of a fibrous preform based on silicon carbide fibres whose shape is close to that of the part to be manufactured and the densification of the preform by a matrix.

It is well known that, in composite materials with fibrous reinforcement, the characteristics of the fibre-matrix interface have a considerable effect on the mechanical properties of the material. It has been shown that satisfactory behaviour can be obtained, particularly in terms of shocks and crack propagation, by forming on the fibres, prior to matrix formation, a low-thickness interphase, for example of pyrolytic carbon deposited in a vapour phase or of boron nitride. Nevertheless, it is still interesting to further improve the mechanical properties of the parts made of composite material.

A solution has been previously put forward for this problem in document WO 2016/207534. This document discloses a stripping method of the surface of SiC fibres of the «Hi-Nicalon S» type prior to the formation of an interphase. In this method, there is initially oxidation of the fibre surface in order to form a surface silica layer then treatment by an acidic liquid medium comprising at least hydrofluoric acid (HF) to remove the silica layer that is formed. After treatment, stripped fibres are obtained having a homogeneous silicon carbide surface conferring improved bonding of the treated fibre to the deposited interphase.

This solution gives satisfactory results. However, the environmental compatibility of this method, which involves HF acid, could be improved. Furthermore, as this method requires carrying out different fibre handling steps: rinsing and drying of treated fibres or moving fibres from one enclosure to another, it would desirable to have simpler treatment that can be carried out more quickly.

SUBJECT AND SUMMARY OF THE INVENTION

According to a first aspect, the invention relates to a method of treating at least one silicon carbide fibre, the method comprising at least the following steps:

a) formation of a silica layer at the surface of a silicon carbide fibre having an oxygen content less than or equal to 1% in atomic percentage, the silica layer being formed by contacting this fibre with an oxidizing medium having a temperature greater than or equal to 50° C. and pressure greater than or equal to 1 MPa («megapascal»; 1 MPa=$10^6$ Pa), the oxidizing medium in particular being in supercritical condition, and b) removal of the silica layer formed by hydrothermal treatment of the fibre obtained after implementation of step a) in which the fibre is treated with water at a pressure between saturating vapour pressure and 30 MPa and at a temperature less than or equal to 400° C.

The silicon carbide fibres having an oxygen content less than or equal to 1% in atomic percentage have a surface layer which leads to a decrease in the quality of adhesion of the fibres to a coating formed at their surface. This decrease in the quality of adhesion is seen by a decrease in the mechanical properties of the part made of composite material formed from these fibres.

These fibres generally have a surface layer consisting predominantly of carbon. Such a surface layer typically has a thickness comprised between 1 nm and 1 μm. However, within a given set of fibres, some fibres can have a surface layer with a different composition. In particular, differences may be found in terms of the composition of the surface layer within the thread formed by a plurality of fibres and/or between several threads of a same batch. The fibres can thus present a surface layer comprised of silicon oxycarbide (consisting of silicon, carbon and oxygen). In the latter case, the surface layer typically has a thickness less than or equal to 100 nm.

This invention proposes a solution for removal of this surface layer, whatever its composition, and consequently for improving the quality of fibre/coating bonding in order to improve the mechanical properties of the part made of composite material obtained.

When a fibre having a surface layer that consists predominantly of carbon is treated, there is during step a) removal of the surface carbon by oxidation, and oxidation of silicon carbide in order to form a silica layer. When a fibre having a surface layer comprising a silicon oxycarbide is treated, there is during step a) oxidation of the oxycarbide in order to form the silica layer. In these two cases, the silica layer formed is then removed in step b). A set of fibres can also be treated whereby a first part of the fibres initially has a surface silica layer, and a second part of the fibres initially has a surface carbon and/or silicon oxycarbide layer. In the latter case, there is no change in the surface layer during step a) for the first part of the fibres, and after step b) a homogeneous surface is obtained where the silica has been removed, for each of the first and second parts of the fibres.

In the invention, a surface silica layer is, during step a), formed by voluntary oxidation then hydrothermal treatment is used to obtain a homogeneous stripped surface of silicon carbide. Furthermore, the pressure and temperature conditions described above for the oxidizing medium during step a) make it possible to obtain a surface silica layer whether the fibre initially has a surface layer predominantly formed of carbon or a surface layer comprised of a silicon oxycarbide. This surface silica layer is then removed by hydrothermal treatment in step b). Step b) is a hydrothermal treatment step of the fibre obtained after implementing step a) so as to remove the silica layer formed during step a).

Thus, treatment according to the invention makes it possible to obtain the same composition at the surface of the treated fibre, whatever the composition of its surface layer before treatment, in other words, the treatment according to the invention produces, after stripping, the same surface composition despite the existing diversity in terms of surface composition for the fibres prior to treatment. This makes it possible to improve the quality of fibre/coating bonding, and therefore of the mechanical properties of the part.

In addition, combining the use of an oxidizing medium under pressure and at temperature during step a) and the use of hydrothermal treatment during step b) advantageously makes it possible to carry out steps a) and b) in the same enclosure, and consequently to eliminate the handling steps of the treated fibre, thus simplifying the method and reducing its duration.

Furthermore, this treatment makes it possible to avoid the use of HF acid and to improve the environmental compatibility of the stripping method. The fact of no longer using HF acid means the need for carrying out rinsing and drying after acid treatment is eliminated, thus further shortening the duration of treatment.

The thickness of the silica layer formed during step a) may be greater than or equal to 1 nm, for example to 5 nm, for example to 10 nm. The thickness of the silica layer formed during step a) can be between 1 nm and 1 µm or even comprised between 1 nm and 100 nm.

In one embodiment, the oxidizing medium has a volumetric dioxygen content comprised between 5% and 100%, the temperature of the oxidizing medium being comprised between 50° C. and 700° C. and the pressure of the oxidizing medium being comprised between 1 MPa and 30 MPa.

These conditions of step a) make it possible to form the silica layer even more efficiently whilst oxidizing the least possible underlying SiC at the same time as applying relatively low working temperature and pressure. These conditions are compatible with industrialization of the method.

In one embodiment, the oxidizing medium has a volumetric dioxygen content comprised between 5% and 50%, the temperature of the oxidizing medium being comprised between 200° C. and 700° C. and the pressure of the oxidizing medium being comprised between 13 MPa and 25 MPa, for example between 15 MPA and 25 MPa.

These conditions of step a) make it possible to further optimize control of the formation of the silica layer.

In one embodiment, the oxidizing medium is a mixture between an inert compound and dioxygen.

In one embodiment, during hydrothermal treatment, the fibre is treated with water at a temperature between 100° C. and 370° C., and for example at pressure between 5 MPa and 30 MPA.

These conditions allow efficient removal of the silica layer and are thus compatible with industrialization of the method.

In one embodiment, before step a), an unwrapping or desizing step of the fibre is carried out by carrying out preliminary hydrothermal or solvothermal treatment.

In cases where the conditions implemented in step a) do not make it possible to carry out unwrapping or desizing, such preliminary treatment can be carried out. When this preliminary treatment is carried out, it can be implemented advantageously in the same enclosure as in steps a) and b), which makes it possible to limit the overall duration of treatment.

In one embodiment, the method further comprises the following step:

c) depositing of an interphase layer on the surface of the fibre obtained after implementation of step b), the interphase layer being for example a boron nitride, possibly doped with silicon, silicon nitride or pyrolytic carbon.

Preferably, the interphase layer is a layer of boron nitride.

In one embodiment, a plurality of silicon carbide fibres can be treated, each having an oxygen content less than or equal to 1% in atomic percentage.

The present invention also relates to a method for the manufacture of a fibrous preform comprising at least one step of treating a plurality of silicon carbide fibres by implementing a method such as described above and one step of formation of a fibrous preform by implementing one or several textile operations from said plurality of fibres treated in this way.

This invention also relates to a method for the manufacture of a fibrous preform comprising at least one step of formation of a fibrous preform by implementing one or several textile operations from a plurality of silicon carbide fibres each having an oxygen content less than or equal to 1% in atomic percentage and a treatment step of said plurality of fibres, once the preform is formed, by implementing a method such as that described above.

This invention also relates to a method for the manufacture of a part made of composite material comprising at least one step of manufacturing of a fibrous preform by implementing a method such as that described above followed by a step for formation of at least one matrix phase of carbon or a ceramic material densifying said fibrous preform.

The part made of composite material can, for example, be a turbomachine part, for example a turbomachine blade.

BRIEF DESCRIPTION OF THE DRAWINGS

Other features and advantages of the invention will emerge from the following description, given without limitation with reference to the appended drawings, in which.

DETAILED DESCRIPTION OF EMBODIMENTS

The invention relates to the treatment of silicon carbide fibres having an oxygen content less than or equal to 1% in atomic percentage. The invention consequently covers the treatment of silicon carbide fibres relatively poor in oxygen, these fibres being distinguished from Si—C—O fibres which have an oxygen content outside of the above-mentioned range.

The fibres treated by the method of the invention can, for example, have a C/Si atomic ratio of between 1 and 1.1, for example between 1 and 1.05. The so-called third generation silicon carbide fibres, such as fibres of the «Hi-Nicalon S» type, have such an atomic ratio as well as an oxygen content less than or equal to 1% in atomic percentage. Other types of silicon carbide fibres can be treated by the method according to the invention such as fibres of the «Hi-Nicalon» type which have a C/Si atomic ratio outside of the above-mentioned range but which have an oxygen content less than or equal to 1% in atomic percentage.

Figure 1A:
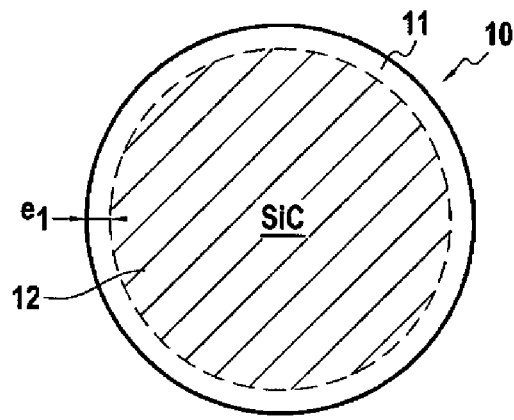
FIGS. 1A to 1C are sectional views representing, diagrammatically and partially, the evolution of the structure of a silicon carbide fibre initially having a surface layer comprising a silicon oxycarbide during the implementation of steps a) and b) according to the invention.
Figure 1B:
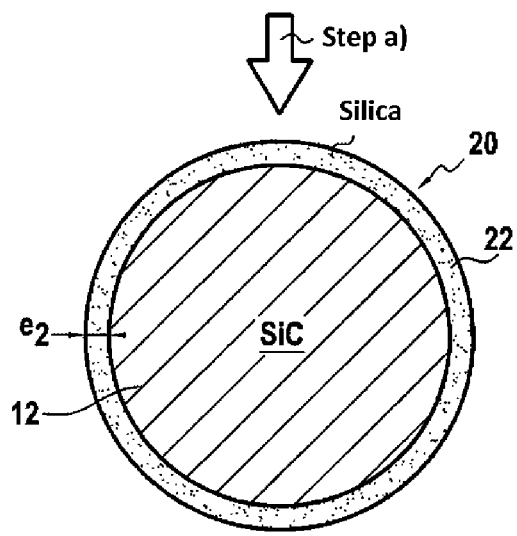
Figure 1C:
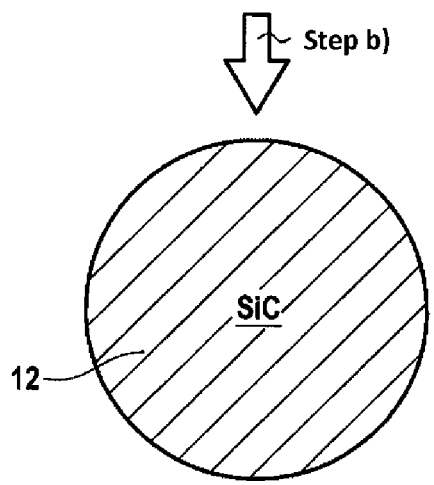

FIG. 1A illustrates very schematically a section of a silicon carbide fibre 10 having an oxygen content less than or equal to 1% in atomic percentage before implementation of the method according to the invention. FIGS. 1A-1C illustrate the treatment of a fibre 10 initially having a surface layer 11 comprising a silicon oxycarbide.

The silicon carbide fibre 10 consists of a core 12 of silicon carbide and a surface layer 11 located near to the surface of the fibre 10. The surface layer 11 has a heterogeneous surface state and here comprises at least one silicon oxycarbide. The surface layer 11 is responsible for a reduction in the quality of adhesion of the fibre to a coating covering it. The thickness $e_1$ of the surface layer 11 can typically be comprised between 1 nm and 100 nm, for example between 5 nm and 100 nm, for example between 10 nm and 100 nm. The surface layer 11 is intended to be removed by implementation of the method according to the invention.

The silicon carbide fibres can be treated in whatever form, for example threads, rovings, strands, cables, fabrics, felts, mats and even two- or three-dimensional preforms. The silicon carbide fibres treated according to the method of the invention can be advantageously used to carry out fibrous preforms of a part made of composite material.

In order to form the fibrous preform, a fibrous texture can firstly be obtained by carrying out one or more textile operations, then this fibrous texture can be shaped in order to obtain a fibrous preform having the desired shape. The fibrous texture can be obtained by three-dimensional weaving, for example with interlock weave, that is to say weaving in which each layer of weft threads binds several layers of warp thread with all the threads of the same weft column having the same movement in the plane of the weave. Other types of three-dimensional weaving can of course be used to produce the fibrous texture. When the fibrous texture is produced by weaving, weaving can be carried out with warp threads extending in the longitudinal direction of the texture, it being noted that weaving with weft threads in this direction is also possible. Different weaving modes which can be used to produce the fibrous texture are described in particular in document WO 2006/136755.

The fibrous texture can also be formed by assembling at least two fibrous structures. In this case, the fibrous structures can be linked together, for example by sewing or needling. The fibrous structures can particularly each be obtained from a layer or stack of several layers of:
  one-dimensional fabric (UD),
  two-dimensional fabric (2D),
  braid,
  knitting,
  felt,
  unidirectional ply (UD) of threads or cables or multidirectional (nD) ply obtained by superposition of several UD plies in different directions and bonding of the UD plies to each other, for example by sewing, by chemical bonding agent or by needling.

In the case of stacking of several layers, these are bonded to each other for example by sewing, by embedding threads or rigid components or by needling.

The silicon carbide fibres can be treated by the method according to the invention before or after carrying out the preform.

In a preliminary manner, it is possible to carry out, before implementing step a), preliminary treatment aimed at removing the sizing or wrapping of the fibre or fibres. Such preliminary treatment is optional insofar as the implementation conditions during step a) can, in some cases, make it possible to carry out desizing and/or unwrapping in addition to forming the silica layer. These fibres can be initially sized or wrapped by polyvinyl alcohol (PVA), for example.

When the preliminary treatment is carried out, it can consist of treatment by hydrothermal or solvothermal route. The solvothermal route can employ one or more alcohols such as methanol or ethanol, or a mixture of water and alcohol. The medium used to carry out this step can be in the liquid state. As a variant, the medium is in supercritical conditions.

The pressure imposed during preliminary treatment may be greater than 1 bar, even greater than or equal to 1 MPa, even greater than or equal to 5 MPa. This pressure may be comprised between 5 MPa and 30 MPa.

The temperature imposed during preliminary treatment may be greater than or equal to 100° C., even comprised between 100° C. and 370° C. or comprised between 100° C. and 250° C.

When water is used to carry out the preliminary treatment, a temperature comprised between 100° C. and 370° C. and pressure comprised between 5 MPa and 30 MPa can be imposed.

When an alcohol is used to carry out the preliminary treatment, a temperature comprised between 100° C. and 250° C. and pressure comprised between 5 MPa and 30 MPa can be imposed.

A mixture of water and alcohol can also be used to carry out the preliminary treatment and a temperature comprised between 100° C. and 370° C. and pressure comprised between 5 MPa and 30 MPa can be imposed. The volume percentage of water in such a mixture of water and alcohol can, for example, be between 25% and 75%.

The duration of preliminary desizing or unwrapping treatment may be greater than or equal to 5 minutes, or even comprised between 5 minutes and 30 minutes.

As indicated above, this preliminary desizing or unwrapping treatment is optional insofar as the conditions employed during step a) can, in certain cases, allow both the removal of the sizing or wrapping and the formation of the silica layer.

We will now describe in more detail steps a) and b) of the formation of the silica layer and its removal.

The fibre 10 is firstly contacted with the oxidizing medium under pressure and at temperature, particularly in supercritical conditions, in order to form the surface silica layer. Details concerning the oxidizing medium implemented during step a) will be described below. Following this contacting, an oxidized fibre 20 is obtained on the surface. In the case of the fibre of FIG. 1A, the surface layer 11 comprising the oxycarbide is oxidized and is chemically transformed into a silica layer 22 having a thickness $e_2$ which, in the illustrated example, is substantially equal to the thickness $e_1$ of the surface layer 11 (see FIG. 1B). The thickness of the silica layer formed can, as a variant, be greater than the thickness of the surface layer 11. The diameter of the fibre remains substantially constant after implementation of step a), in the case of FIGS. 1A and 1B.

Figure 1D:
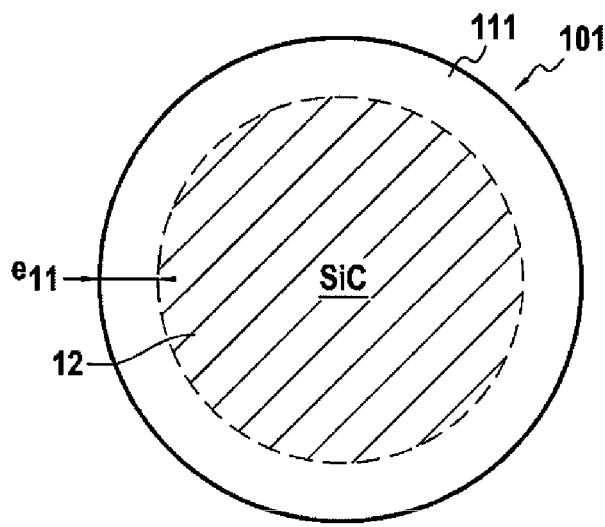
FIGS. 1D to 1F are sectional views representing, diagrammatically and partially, the evolution of the structure of a silicon carbide fibre initially having a surface layer formed predominantly of carbon during the implementation of steps a) and b) according to the invention.
Figure 1E:
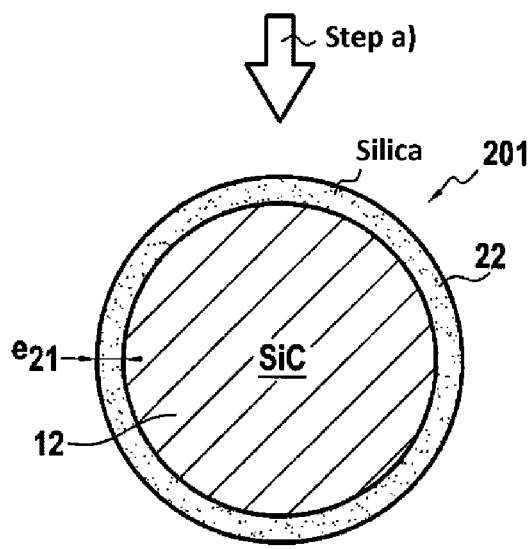

In the case of the fibre 101 of FIG. 1D which has a surface layer 111 predominantly formed of carbon, there is a decrease in the diameter of the fibre following step a). Carbon can be the main element by atomic proportion in the surface layer 111. The atomic content in carbon in the surface layer 111 can be greater than or equal to 50%, for example to 60%. Initially, the surface layer 111 has a thickness $e_{11}$, typically comprised between 1 nm and 1 μm. Following step a), there is removal of this surface layer 111 and oxidation of SiC, so as to form the silica layer 22. The thickness $e_{21}$ of the silica layer 22 obtained can typically be a few nm or tens of nm. The fibre obtained after step a) is referenced 201. Following step a), there is a reduction here in the diameter of the fibre, due to removal of the layer 111.

The pressure of the oxidizing medium during step a) may be greater than or equal to 1 MPA, even greater than or equal to 5 MPa. This pressure may be comprised between 5 MPa and 30 MPa.

The temperature of the oxidizing medium during step a) may be greater than or equal to 50° C., for example be greater than or equal to 200° C., for example be greater than or equal to 400° C. This temperature may be comprised between 50° C. and 700° C., for example be comprised between 200° C. and 700° C., even between 400° C. and 700° C.

The oxidizing medium can comprise at least one compound chosen from: dioxygen, oxygenated water, ozone, an alkali metal permanganate, or an alkali metal dichromate. When the oxidizing medium is different from dioxygen, the values described above for the temperature and pressure of this oxidizing medium during step a) remain valid. As an example, the oxidizing medium may be an aqueous solution comprising oxygenated water at a rate of 3% to 90% in mass, or an aqueous solution of an alkali metal permanganate or dichromate at a concentration below the limit of solubility in water.

Advantageously, the oxidizing medium comprises at least dioxygen.

Advantageously, the oxidizing medium can have a volume content in dioxygen comprised between 5% and 100%, the temperature of the oxidizing medium being comprised between 50° C. et 700° C. and the pressure of the oxidizing medium being between 1 MPa and 30 MPa.

The oxidizing medium can be a mixture between an inert compound, such as nitrogen, argon or carbon dioxide, and dioxygen. The oxidizing medium can, in particular, be air.

The silica carbide fibre can be contacted with the oxidizing medium during step a) for a duration greater than or equal to 1 minute, for example greater than or equal to 5 minutes, for example greater than or equal to 10 minutes, for example greater than or equal to 15 minutes. This duration is for example comprised between 15 minutes and 5 hours.

Once the silica layer is obtained, it is then removed, during step b), by contacting with water under hydrothermal conditions. During this treatment, the silicon atoms contained in the silica layer are hydrolyzed. After step b), a homogeneous fibre surface of SiC is obtained. Operating conditions that can be used in the hydrothermal treatment of step b) have been described in application WO 2014/114874 for the formation of a layer of microporous carbon on SiC Nicalon® fibres having an oxygen content greater than 1% in atomic percentage.

The water used during step b) is at a pressure comprised between the saturating vapour pressure and 30 MPa and at a temperature less than or equal to 400° C. The water pressure used during step b) can be between 5 MPa and 30 MPa. The temperature of the water used during step b) can be comprised between 100° C. and 400° C., or even be comprised between 100° C. and 370° C., even between 200° C. and 370° C.

The water used during step b) may have a temperature below the critical temperature, which is equal to 374° C., and a pressure comprised between the saturating vapour pressure and 30 MPa. Such a case corresponds to water in subcritical condition.

The water used during step b) may have a temperature comprised between 350° C. and 400° C. and a pressure comprised between 15 MPa and 30 MPa. Such a case corresponds to water in conditions close to the critical point.

Advantageously, water used during step b) is at a temperature comprised between 100° C. and 370° C. and for example at a pressure comprised between 5 MPa and 30 MPa.

The duration of hydrothermal treatment can be greater than or equal to 15 minutes, and for example be comprised between 15 minutes and 5 hours.

The water used during step b) may or may not be added with alcohol. The use of alcohol in water makes it possible to slow down the kinetics of silica removal which can be advantageous if it is required to fine tune the kinetics of step b).

Figure 1F:
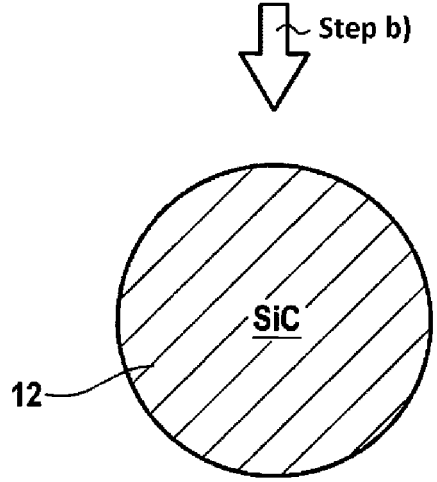

FIGS. 1C and 1F represent the result obtained after implementation of steps a) and b) for the two types of fibres. In both cases, a silicon carbide fibre is obtained having a surface state as well as a homogeneous composition. In the illustrated examples, after step b) removal of the entire surface layer 11 or 111 is obtained, whatever its chemical nature.

The steps which have just been described may be carried out in closed, semi-continuous or continuous mode.

In closed mode, the treated fibre or fibres as well as the treatment medium are kept in a closed enclosure. The system is maintained under the desired temperature and pressure conditions for the time required to carry out the treatment. Next, the medium is removed from the reactor then the fibre or fibres are recovered.

In semi-continuous mode, the fibres are kept in an enclosure and are subjected to a continuous flow of the treatment medium. The treatment medium circulates continuously through the enclosure and is evacuated from there loaded with the material to be extracted.

The continuous mode is similar to the semi-continuous mode with the difference that the fibres also circulate through the enclosure during the treatment. The fibre or fibres are unwound from a reel of untreated fibres, pass through the treatment zone and are then wound in the form of a reel after treatment.

For example, when the treatment medium circulates through the enclosure during the above-mentioned treatments, the flowrate of this treatment medium through the enclosure can be comprised between 1 mL/minute and 6 mL/minute.

An interphase layer can then be deposited in contact with the surface of the fibre obtained after implementation of steps a) and b).

The depositing of an interphase layer directly on the surface of the stripped fibre is carried out in a manner known per se by passing through a reactor or in closed mode.

The fibre treated according to the method of the invention has improved bonding with the interphase layer. The interphase layer may be a layer of boron nitride (BN) or a layer of pyrolytic carbon (PyC). The thickness of the interphase layer may for example be greater than or equal to 20 nm, for example be comprised between 20 nm and 1500 nm. One or more additional layers can be deposited on the interphase layer, for example of a ceramic material such as SiBC, BNSi or silicon carbide.

Once the interphase layer is deposited, it is then possible to form a part made of the composite material with improved mechanical properties by densifying by at least one matrix phase a fibrous preform comprising the treated fibres coated with the interphase layer. The fibrous preform forms the fibrous reinforcement of the part made of composite material and the matrix phase is formed in the porosity of the fibrous preform. The matrix phase can for example be made of silicon carbide or carbon.

This densification is carried out in a manner known per se. The densification of the fibrous preform can thus be carried out by liquid route (impregnation with a precursor resin of the matrix and transformation by crosslinking and pyrolysis, the method being able to be repeated) or by gas route (chemical infiltration in the vapour phase of the matrix). The invention applies particularly to the production of parts made of ceramic matrix composite material (CMC) formed by fibrous reinforcement made of silicon carbide fibres densified by a ceramic matrix, particularly carbide, nitride, refractory oxide, etc. Typical examples of such CMC are SiC—SiC materials (silicon carbide fibre reinforcement and silicon carbide matrix). The matrix phase can also be carried out by infiltration of silicon in a molten state (Melt-Infiltration Method).

As a variant, the matrix can be directly formed in contact with the surface of the treated fibres (no interphase layer between the fibres and the matrix).

EXAMPLE

Figure 2:
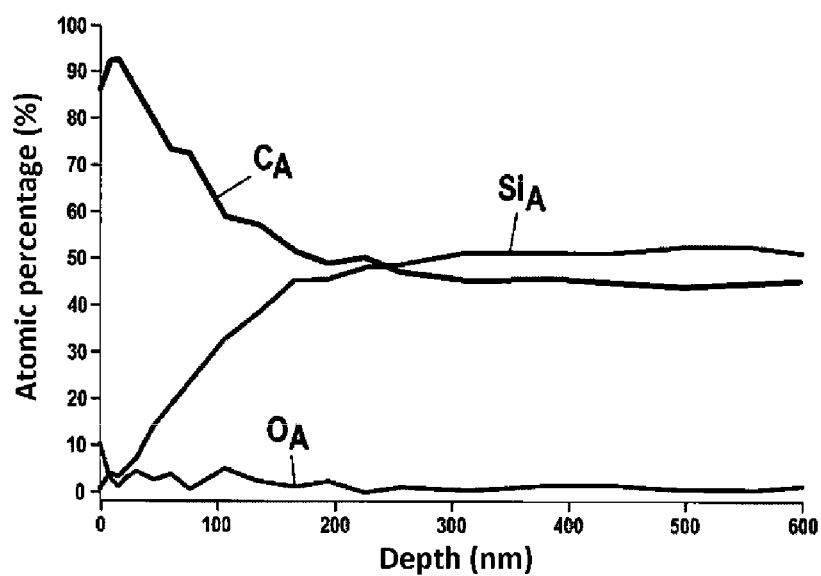
FIG. 2 represents the evolution, as a function of depth, of the atomic percentages of silicon elements (atomic percentage noted $Si_A$), carbon (atomic percentage noted $C_A$) and oxygen (atomic percentage noted $O_A$) of a fibre before treatment according to the invention.

A fibre fabric of the «Hi-Nicalon S» type sized and wrapped with PVA was first subjected to preliminary hydrothermal treatment under continuous water flux at 300° C. under 25 MPa for about 20 minutes. This treatment made it possible to carry out desizing and unwrapping of these fibres. FIG. 2 is an AUGER analysis result showing the changes, as a function of depth, in the proportions of silicon ($Si_A$), carbon ($C_A$) and oxygen ($O_A$) within the «Hi-Nicalon S» SiC fibres before implementation of a step a) according to the invention. The fibres had a layer on the surface before treatment predominantly formed of carbon having a thickness of approximately 200 nm.

A step a) of oxidizing the surface of the fibres thus obtained was then carried out in closed mode.

The oxidation of the surface of SiC fibres was carried out using an oxidizing medium under pressure and temperature. The oxidizing medium used was a $CO_2/O_2$ mixture comprising 20% by volume of oxygen. The oxidizing medium used had a temperature of 600° C. and a pressure comprised between 13 MPa and 15 MPa. Contacting of the fibres with the oxidizing medium was carried out for two hours.

Figure 3:
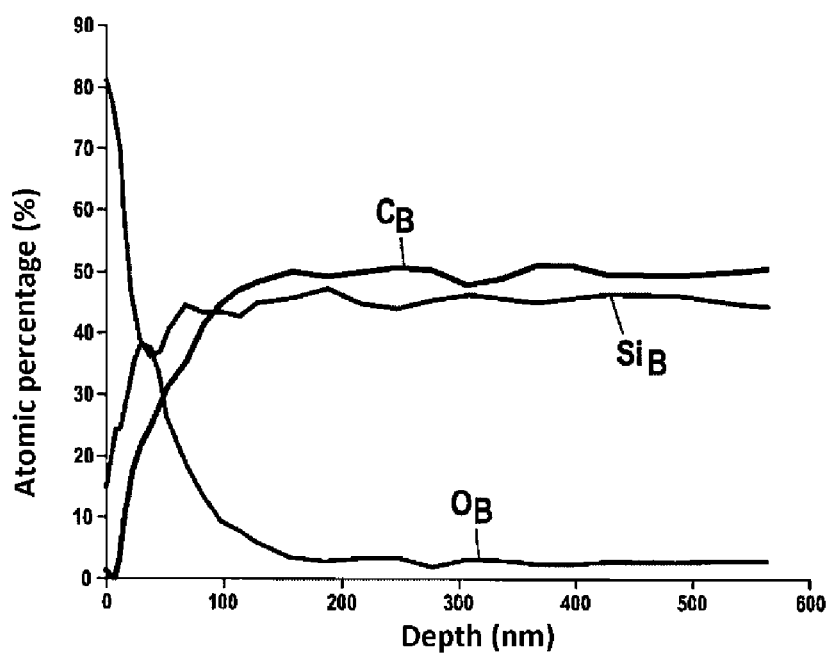
FIG. 3 represents the evolution, as a function of depth, of the atomic percentages of silicon elements (atomic percentage noted $Si_B$), carbon (atomic percentage noted $C_B$) and oxygen (atomic percentage noted $O_B$) of a fibre after carrying out an example of step a).

FIG. 3 is an AUGER analysis result relating to the fibres obtained after treatment with oxidizing medium. The removal of the surface carbon and the formation of a layer of silica having a thickness of about 100 nm is observed.

The silica layer obtained after the oxidation step was then removed by hydrothermal treatment at a temperature of 300° C. and under pressure of 25 MPa. This hydrothermal treatment was carried out for 30 minutes.

This method was carried out in a single enclosure allowing the use of fluids under pressure and temperature. The fact of being able to implement this method in the same enclosure has made it possible to simplify the method and to significantly reduce its duration. All the fibres of the SiC fibre base fabric obtained after the treatment had a homogeneous SiC surface.

The expression «comprised between . . . and . . . » must be understood as including the limits.

The invention claimed is:

1. A method of treating at least one silicon carbide fibre, the method comprising:
   a) forming a silica layer at the surface of a silicon carbide fibre, the silicon carbide fibre having an oxygen content less than or equal to 1% in atomic percentage, the silica layer being formed by contacting said silicon carbide fibre with an oxidizing medium having a temperature greater than or equal to 50° C. and pressure greater than or equal to 1 MPa, and step a) being such that:
      the treated fibre has a surface layer predominantly formed of carbon and there is during step a) removal of the surface carbon by oxidation and oxidation of silicon carbide in order to form a silica layer, or
      the treated fibre has a surface layer comprising a silicon oxycarbide and there is during step a) oxidation of the oxycarbide in order to form a silica layer, and
   b) removal of the silica layer formed by hydrothermal treatment of the fibre obtained after implementation of step a) in which the fibre is treated with water at a pressure between saturating vapour pressure and 30 MPa and at a temperature less than or equal to 400° C.

2. The method according to claim 1, wherein the oxidizing medium has a volumetric dioxygen content comprised between 5% and 100%, the temperature of the oxidizing medium being comprised between 50° C. and 700° C. and the pressure of the oxidizing medium being comprised between 1 MPa and 30 MPa.

3. The method according to claim 2, wherein the oxidizing medium has a volumetric dioxygen content comprised between 5% and 50%, the temperature of the oxidizing medium being comprised between 200° C. and 700° C. and the pressure of the oxidizing medium being comprised between 13 MPa and 25 MPa.

4. The method according to claim 1, wherein the oxidizing medium is a mixture between an inert compound and dioxygen.

5. The method according to claim 1, wherein during hydrothermal treatment, the fibre is treated with water at a temperature comprised between 100° C. and 370° C.

6. The method according to claim 1, wherein, before step a), an unwrapping or desizing step of the fibre is carried out by carrying out preliminary hydrothermal or solvothermal treatment.

7. The method according to claim 1, further comprising:
   c) depositing of an interphase layer on the surface of the fibre obtained after implementation of step b), the interphase layer being for example a boron nitride, possibly doped with silicon, silicon nitride or pyrolytic carbon.

8. The method according to claim 1, wherein a plurality of silicon carbide fibres is treated, each having an oxygen content less than or equal to 1% in atomic percentage.

9. A method for the manufacture of a fibrous preform comprising at least one step of treating a plurality of silicon carbide fibres by implementing a method according to claim 8 and one step of formation of a fibrous preform by implementing one or several textile operations from said plurality of fibres treated in this way.

10. A method for the manufacture of a part made of composite material comprising at least one step of manufacturing of a fibrous preform by implementing a method according to claim 9 followed by a step for formation of at least one matrix phase of carbon or a ceramic material densifying said fibrous preform.

11. A method for the manufacture of a fibrous preform comprising at least one step of formation of a fibrous preform by implementing one or several textile operations from a plurality of silicon carbide fibres each having an oxygen content less than or equal to 1% in atomic percentage and a treatment step of said plurality of fibres, once the preform is formed, by implementing a method according to claim 8.

\* \* \* \* \*